US007546244B2

(12) United States Patent
Yoshihara et al.

(10) Patent No.: US 7,546,244 B2
(45) Date of Patent: Jun. 9, 2009

(54) IMAGE PROCESSING SYSTEM AND INFORMATION PROCESSING METHOD

(75) Inventors: Kunio Yoshihara, Sagamihara (JP);
Yoichi Takaragi, Yokohama (JP);
Akihiro Matsuya, Yokohama (JP);
Tatsuo Shinagawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 971 days.

(21) Appl. No.: 10/999,992

(22) Filed: Dec. 1, 2004

(65) Prior Publication Data
US 2005/0141024 A1 Jun. 30, 2005

(30) Foreign Application Priority Data
Dec. 2, 2003 (JP) ............................. 2003-403553

(51) Int. Cl.
*G06Q 50/00* (2006.01)
(52) U.S. Cl. ........................................................ 705/1
(58) Field of Classification Search ................. 705/59, 705/1; 715/246; 386/95; 378/96; 382/243
See application file for complete search history.

(56) References Cited

U.S. PATENT DOCUMENTS

| 5,926,575 | A | * | 7/1999 | Ohzeki et al. ............... 382/243 |
| 5,930,369 | A | | 7/1999 | Cox et al. ..................... 380/54 |
| 6,208,735 | B1 | | 3/2001 | Cox et al. ..................... 380/51 |
| 2001/0029513 | A1 | * | 10/2001 | Kuwano et al. ............. 707/522 |
| 2004/0230842 | A1 | * | 11/2004 | Osada .......................... 713/202 |
| 2005/0084244 | A1 | * | 4/2005 | Murabayashi ................ 386/95 |
| 2006/0056591 | A1 | * | 3/2006 | Borgmann .................... 378/96 |

FOREIGN PATENT DOCUMENTS

| JP | 9-191394 | 7/1997 |
| JP | 2000-224407 | 8/2000 |
| JP | 2000-285024 | 10/2000 |
| JP | 2001-202436 | 7/2001 |

OTHER PUBLICATIONS

Athale, Ravindra Anant, "Studies in Digital Optical Processing", Apr. 1981, University of California, San Diego, 168 pages; AAT 8107454; ProQuest document ID: 749723851, http://proquest.umi.com/pqdweb?did=749723851&sid=4&Fmt=2&clientId=19649&RQT=309&VName=PQD, Abstract.*

* cited by examiner

*Primary Examiner*—Jamisue A Plucinski
*Assistant Examiner*—Kimberly Evans
(74) *Attorney, Agent, or Firm*—Fitzpatrick, Cella, Harper & Scinto

(57) ABSTRACT

Since an image processing system that can authenticate the originality of digital data adopts an arrangement that does not save and manage digital data in a server, the server scale can be prevented from increasing, and the security can be improved. To this end, in this invention, in an image processing system in which a client and server are connected to be able to communicate with each other, the feature amount and user ID of digital data to be registered are registered in the server, and the digital data is saved in the client in correspondence with the registration number and registration date upon registering the feature amount and user ID.

2 Claims, 13 Drawing Sheets

FIG. 9

CERTIFICATE OF AUTHORIZED REGISTRATION

REGISTRATION NUMBER : XXXXXX     DATE   MAY 6, 2002

AUTHENTICATED AS REGISTERED DOCUMENT

AUTHENTICATION NUMBER : YYYYYY
AUTHENTICATION DATE : MAY 9, 2002

FIG. 10

UNAUTHORIZED REGISTRATION

REGISTRATION NUMBER : XXXXXX     DATE   MAY 6, 2002

CANNOT BE AUTHENTICATED AS REGISTERED DOCUMENT

AUTHENTICATION NUMBER : YYYYYY
AUTHENTICATION DATE : MAY 9, 2002

FIG. 11

CERTIFICATE OF AUTHORIZED REGISTRATION

| OK | YYYYYY | OK | YYYYYY | OK | YYYYYY |
|----|--------|----|--------|----|--------|
| OK | YYYYYY | OK | YYYYYY | OK | YYYYYY |

~1101

REGISTRATION NUMBER : XXXXXX     DATE   MAY 6, 2002

AUTHENTICATED AS REGISTERED DOCUMENT

AUTHENTICATION NUMBER : YYYYYY
AUTHENTICATION DATE : MAY 9, 2002

| OK | YYYYYY | OK | YYYYYY | OK | YYYYYY |
|----|--------|----|--------|----|--------|
| OK | YYYYYY | OK | YYYYYY | OK | YYYYYY |

FIG. 13

UNAUTHORIZED REGISTRATION

REGISTRATION NUMBER : XXXXXX    DATE   MAY 6, 2002

REGISTERED CONTENTS ARE DIFFERENT FROM CURRENT DOCUMENT

AUTHENTICATION NUMBER : YYYYYY
AUTHENTICATION DATE : MAY 9, 2002

US 7,546,244 B2

IMAGE PROCESSING SYSTEM AND INFORMATION PROCESSING METHOD

FIELD OF THE INVENTION

The present invention relates to an information processing technique in an image processing system that can authenticate the originality (originality: digital data is original one and has not undergone any tampering or the like) of digital data.

BACKGROUND OF THE INVENTION

Conventionally, various proposals have been made in the field of original digital data authentication. For example, according to the invention disclosed in Japanese Patent Laid-Open No. 2000-285024, the nature of a paper's originality is provided to digital data to improve the verification performance of the digital data. More specifically, upon saving digital data in a server, a file property code indicating an original is appended to the digital data, so that the digital data can be saved and uniquely identified from at least other digital data.

Japanese Patent Laid-Open No. 2001-202436 proposes an electronic application system which assures security of application documents which are transmitted from terminals and are saved in a server for years. According to the electronic application system disclosed in Japanese Patent Laid-Open No. 2001-202436, a document storage device that saves digital data as application documents is provided, and the presence/absence of tampering is detected on the basis of information which is transmitted from a terminal and includes an application document so as to calculate a tampering detection code. After that, the transmitted information is saved in the document storage device together with the tampering detection code.

Furthermore, Japanese Patent Laid-Open No. 2000-224407 discloses an arrangement which appends a message digest value on a recording medium such as a paper sheet in a form that can hardly be tampered so as to improve the reliability of a printout upon printing digitally signed digital data.

However, when all digital data as originals are saved in a server and are managed by that server as in the inventions disclosed in Japanese Patent Laid-Open Nos. 2000-285024 and 2001-202436, a large-scale storage device must be prepared on the server side, and its maintenance and management become complicated. Also, in the case where all digital data are held on an external storage device to the server or the like over a long period, it becomes improper in terms of security.

The invention disclosed in Japanese Patent Laid-Open No. 2000-224407 proposes a strategy required to improve the reliability of a printout upon printing digitally signed digital data. In the case, not only the originality of that printout is assured, but also the registration date or the like of the printed digital data as an original is specified, thus it is more convenient for an user to use such printout.

SUMMARY OF THE INVENTION

The present invention has been made in consideration of the aforementioned problems, and has as its first object to structure, not save or manage, the digital data on a server in order to preserve data integrity and confidentiality while avoiding the increase in server load within the scope of an image processing system that can authenticate the originality of digital data.

As a second object, the present invention improves the user's ease with printouts by specifying the registration date or the like upon printing registered digital data in the image processing system.

In order to achieve the above objectives, the image processing system according to the present invention comprises the following arrangements. That is, there is provided an image processing system in which a client and server are connected to be able to communicate with each other, wherein the client comprises:
extraction unit configured to extract a feature amount of digital data to be printed; and
first transmission unit configured transmit the feature amount extracted by the extraction unit and a user identifier of the client to the server, the server comprises:
first storage unit configured to store the feature amount and identifier transmitted by the first transmission unit; and
second transmission unit configured to transmit a date of storage in the first storage unit, and information used to specify the feature amount and identifier stored in the first storage unit to the client, and the client stores the date and information transmitted by the second transmission unit in second storage unit in correspondence with the digital data, and outputs the date and information transmitted by the second transmission unit, and the digital data to print them on a predetermined recording medium.

According to the present invention, since the image processing system, which can authenticate the originality of digital data, adopts a structure that does not save or manage digital data on the server, the server load can be prevented from increasing, and the security can be improved.

Also, according to the present invention, since the image processing system specifies the registration date or the like upon printing registered digital data, the ease of the user who uses the printout can be improved.

Other features and advantages of the present invention will be apparent from the following description taken in conjunction with the accompanying drawings, in which similar reference characters designate the same or similar parts throughout the figures.

BRIEF DESCRIPTION OF THE DRAWINGS

The accompanying drawings, which are incorporated in and constitute part of the specification, illustrate the embodiments of the invention and, together with the description, serve to explain the principles of the invention.

FIG. 9 shows an example of a printed certificate of authorized registration;

FIG. 10 shows an example of a printed message indicating that registration cannot be authenticated;

FIG. 11 shows an example of a printed certificate of authorized registration;

FIG. 13 shows an example of a printed message indicating that registration cannot be authenticated.

DETAILED DESCRIPTION OF THE PREFERRED EMBODIMENTS

Preferred embodiments of the present invention will now be described in detail in accordance with the accompanying drawings.

[Hardware Arrangement of Original Registration Server and User Personal Computer]

Figure 1:
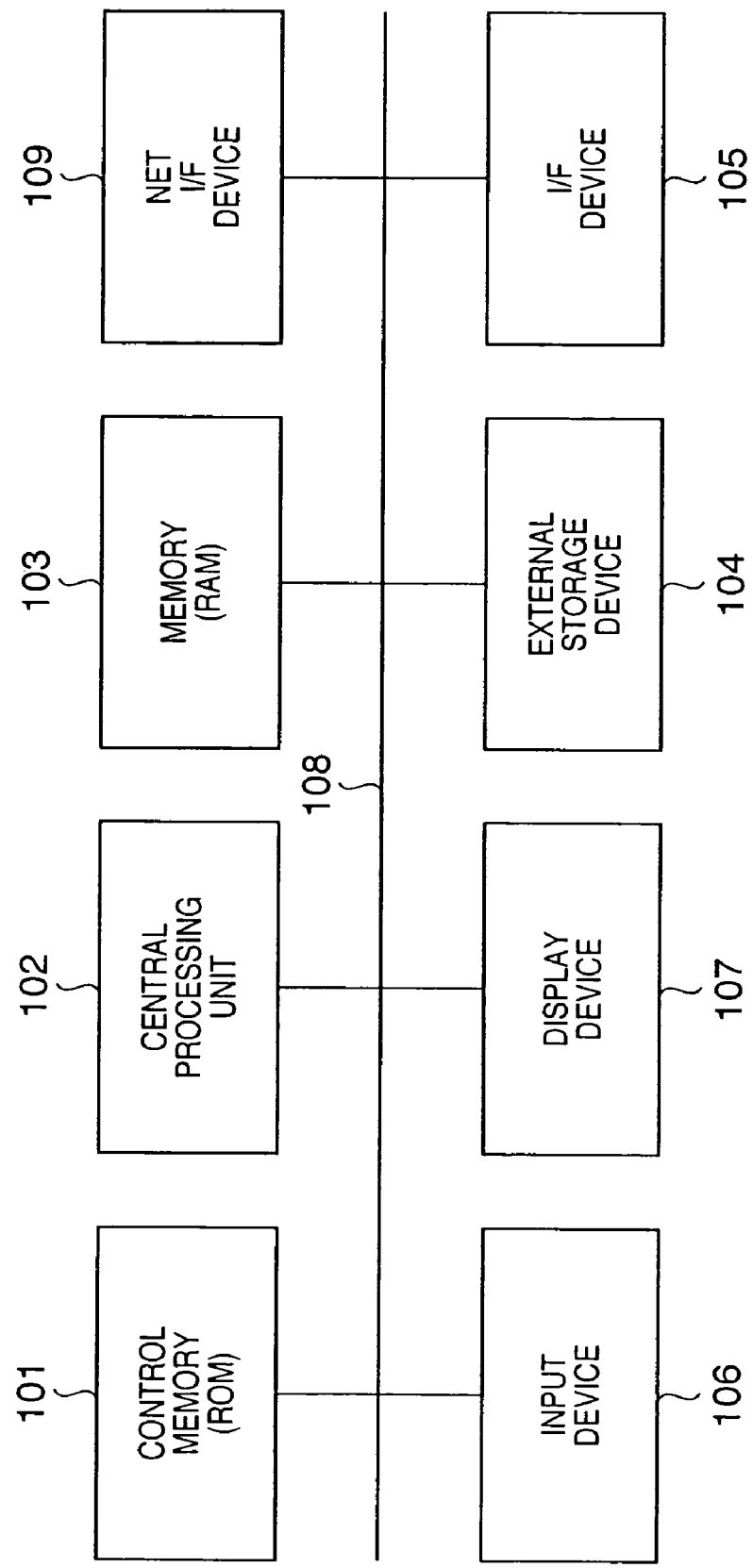
FIG. 1 is a block diagram showing the hardware arrangement common to an original registration server and a user's personal computer serving as a client terminal, which form, together, an image processing system according to the embodiment of the present invention.

FIG. 1 is a block diagram showing the hardware arrangement common to an original registration server (to be described later) and a user's personal computer (to be described later) serving as a client terminal, which, together, form an image processing system according to the embodiment of the present invention.

Referring to FIG. 1, reference numeral 101 denotes a control memory (ROM); 102, a central processing unit; 103, a memory (RAM); 104, an external storage device; 105, an I/F device used to connect various devices such as a printer, reader, and the like to be described later; 106, an input device; 107, a display device; 108, a bus; and 109, a network I/F device (NET I/F device) used to connect an original registration server (or a user's personal computer). A control program required to implement an information processing function according to this embodiment and data used in that control program are stored in the control memory 101. The control program and the data are loaded onto the memory 103 via the bus 108 under the control of the central processing unit 102, and are then executed by the central processing unit 102.

[Arrangement of Image Processing System]

Figure 2:
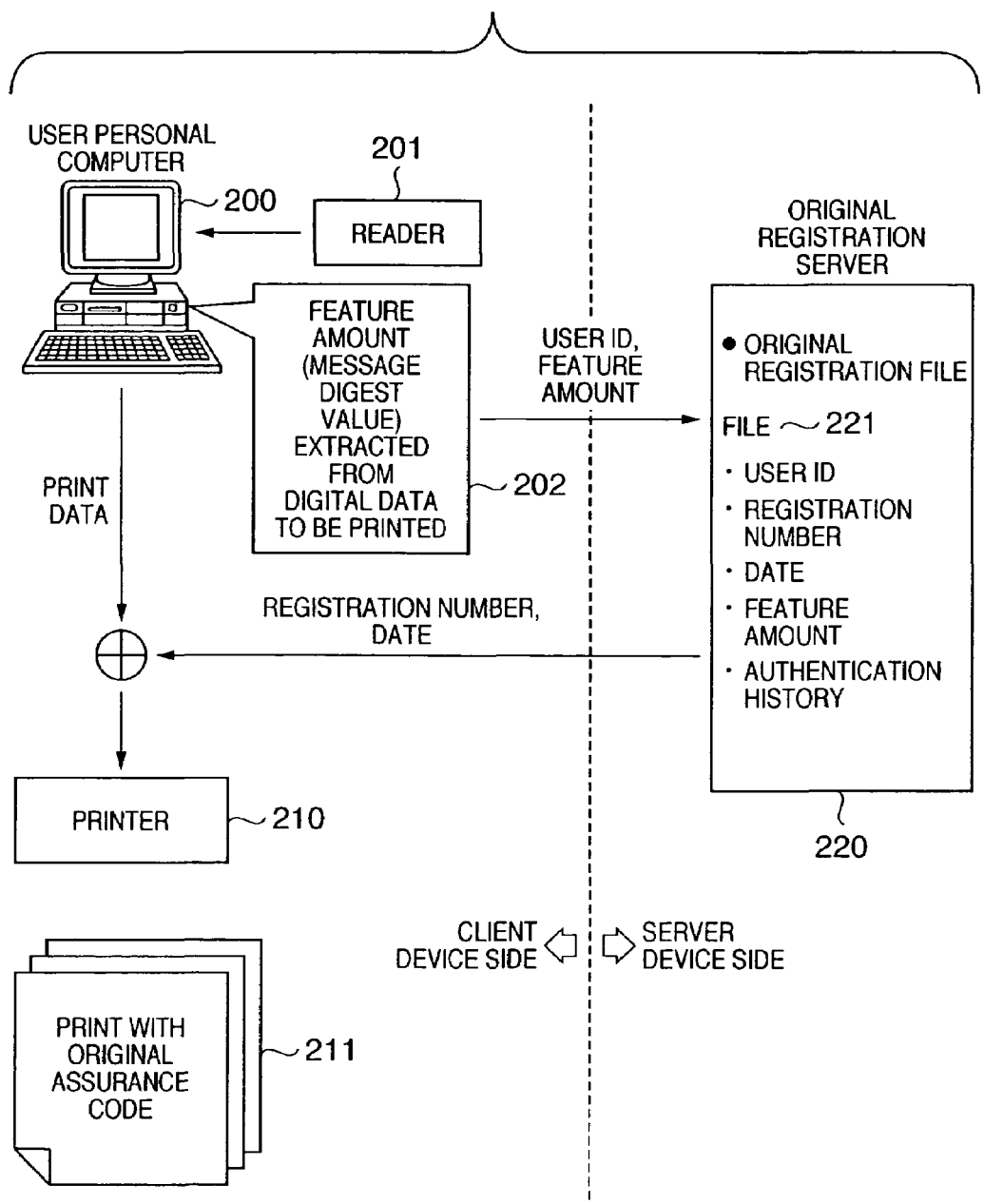
FIG. 2 is a block diagram showing the structure of the image processing system according to the embodiment of the present invention.

FIG. 2 is a block diagram showing the arrangement of the image processing system according to the embodiment of the present invention. As shown in FIG. 2, the image processing system includes the server device side and the client device side. An original registration server 220 is setup on the server device side, and a user's personal computer 200, and a reader 201 and printer 210 connected to the user's personal computer 200 are setup on the client device side. Note that the original registration server 220 and user personal computer 200 are connected to be able to communicate with each other. The reader 201 is used to read information printed on a recording medium, such as a paper sheet, upon authenticating the originality of the digital data printed on the recording medium by the printer 210.

[Registration Process of Digital Data]

The process flow upon registering digital data using the image processing system will be explained below. In the image processing system according to this embodiment, "original registration print" that registers digital data and then prints it out so as to authenticate the originality of a printed recording medium such as a paper sheet or the like upon printing digital data on the recording medium, and "normal print" that normally prints data without any registration can be selectively executed in accordance with a user's instruction. The processes to be executed when "original registration print" is selected will be explained below.

The user's personal computer 200 on the client device side extracts a feature amount from digital data to be printed (202), and transmits the extracted feature amount to the original registration server 220 together with a user ID using transmission means (not shown).

The original registration server 220 receives the user ID (identifier) and feature amount, and stores them in the first storage means (not shown) in the original registration server 220 as an original registration file 221 together with a registration number (information required to specify the user ID and feature amount) and a registration date.

The original registration server 220 notifies the user's personal computer 200 of the registration number and registration date corresponding to the original registration file stored in the first storage means. The user's personal computer 200 stores the notified registration number and registration date in a second storage means (not shown) in the user's personal computer 200 together with the digital data. In this manner, registration of the digital data to be printed is complete.

As described above, in the image processing system according to this embodiment, digital data are not saved in the original registration server 220, and only the feature amounts, registration numbers, and the like of the digital data are saved as original registration files. The digital data are distributed and saved in individual personal computers on the client device side together with their registration numbers and registration dates. In this way, overload of the original registration server 220 can be avoided, and security can be improved.

In order to print the digital data, the user's personal computer 200 converts the digital data into print data, appends the registration number and registration date received from the original registration server 200, and the feature amount of the digital data to the converted print data, and outputs that data as a file to print 211 with an original authentication code via the printer 210.

Figure 3:
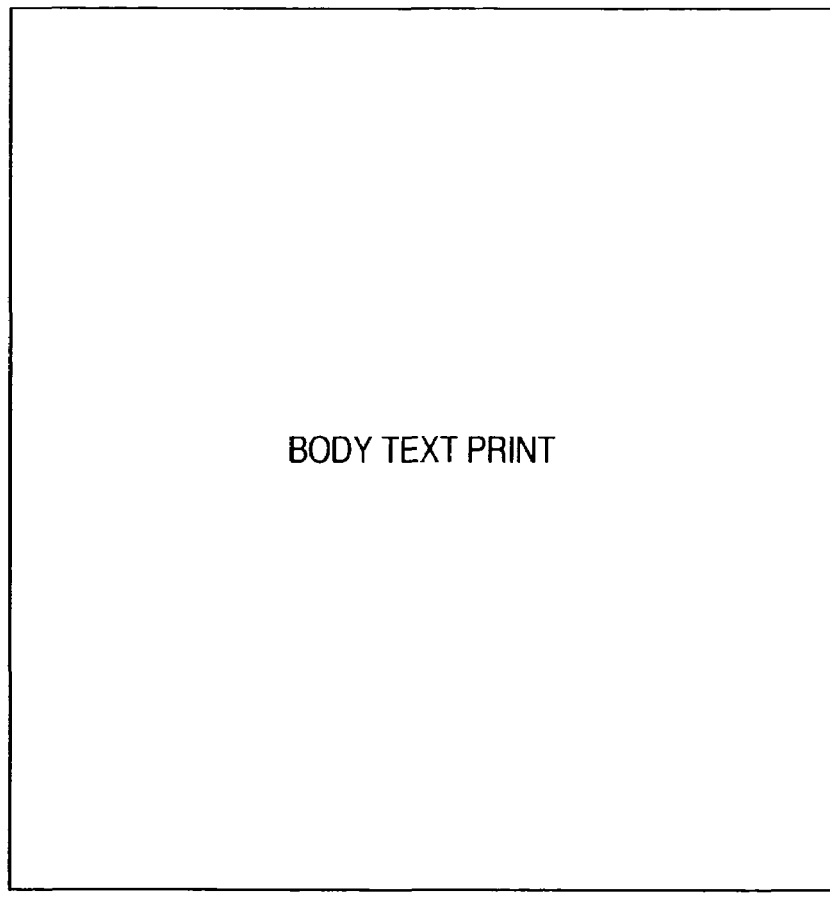
FIG. 3 is a view for explaining the print contents of a print 211 with an original authentication code.

FIG. 3 shows an example of the print result of the print 211 with an original authentication code. Referring to FIG. 3, numeral reference 301 denotes the registration number and registration date which are received from the original registration server 220 and appended to the print data; and 302, a body text part of the printed print data.

Figure 4:
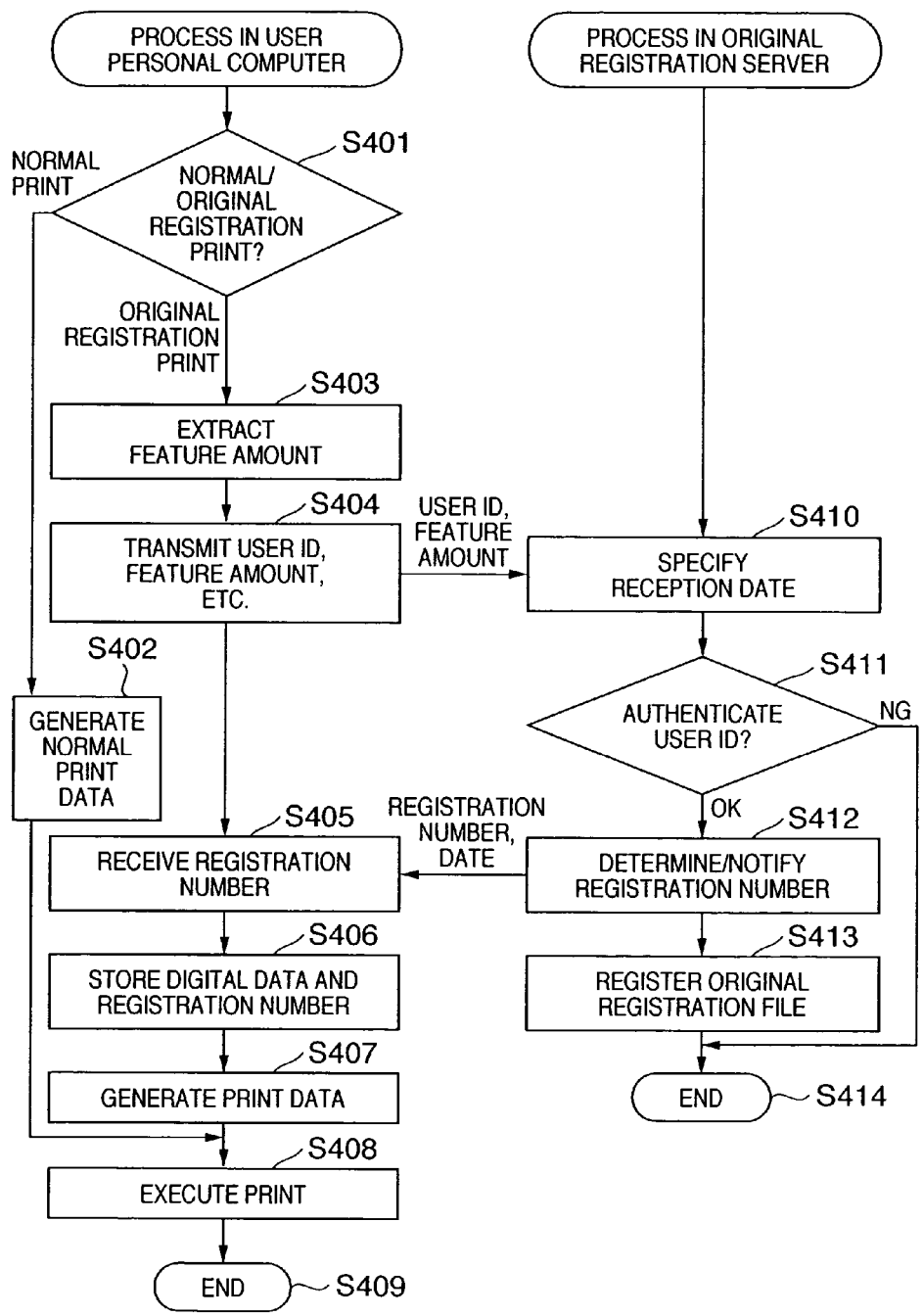
FIG. 4 is a flowchart showing the process flow upon printing within the image processing system.
Figure 12:
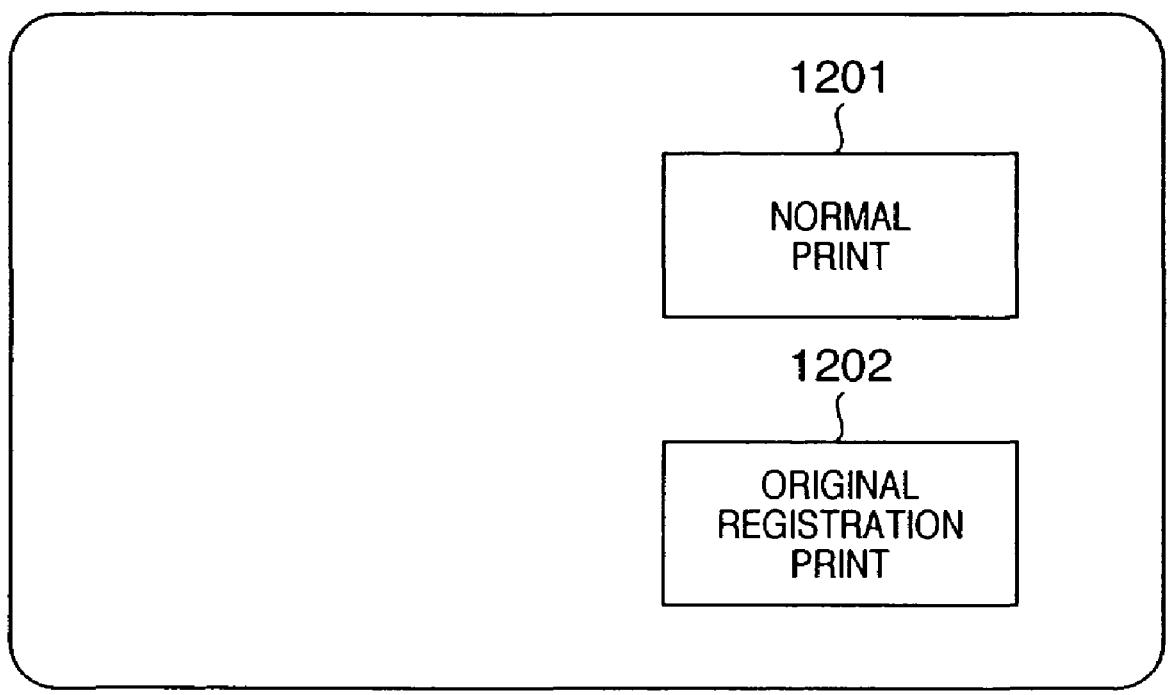
FIG. 12 shows an example of an operation window displayed on a display device of the user's personal computer.

FIG. 4 is a flowchart showing the process flow upon printing digital data in the aforementioned image processing system. Steps S401 to 5409 indicate processes in the user personal computer 200, and steps S410 to S414 indicate those in the original registration server 220. In step S401, the user selects "normal print" (1201) or "original registration print" (1202) on the operation window of the display device 107 of the user personal computer 200 shown in FIG. 12. If the user selects "original registration print" (1202), the processes in steps S403 to S407 are executed. On the other hand, if the user selects "normal print" (1201), the process in step S402 is executed.

In step S402, print data of only the print data body text part 302 shown in FIG. 3 is generated. On the other hand, in step S403 digital data undergoes hash conversion to extract a message digest value as a feature amount (to be described in detail later).

In step S404, the user ID that has already been set in the user personal computer 200 is extracted. Furthermore, the feature amount extracted in step S403 and the user ID extracted in step S404 are transmitted to the original registration server 220.

In step S405, the registration number and registration date sent from the original registration server 220 are received. In step S406, the digital data and the received registration number and registration date are stored in the second storage means. Note that the second storage means used to store the digital data and the received registration number and registration date are arranged in the user personal computer 200.

In step S407, print data including 301 and 302 shown in FIG. 3 is generated. In step S408, a print process is executed and print data is output to the printer 210 to print the print data appended with the feature amount (not shown in FIG. 3), registration number (301), and registration date (302) on a recording medium via the printer 210.

The processes (steps S410 to S414) in the original registration server will be explained below. In step S410, the date (registration date) of reception of the user ID and feature amount transmitted from the user personal computer 200 are specified. It is verified in step S411 if the user ID transmitted from the user personal computer 200 is authentic. Whether or not the user ID is authentic is verified by, e.g., authenticating if that user ID indicates an authentic user registered in advance. Also, in an image processing system that performs paid original registration, a charge process is done in this step. If the user ID is authentic, the processes in steps S412 and S413 are executed.

In step S412, a registration number is uniquely determined based on the user ID, and is transmitted to the user personal computer 200 together with the registration date. In step S413, the original registration file 221 shown in FIG. 2 is stored in the first storage means in the original registration server 220.

Figure 5:
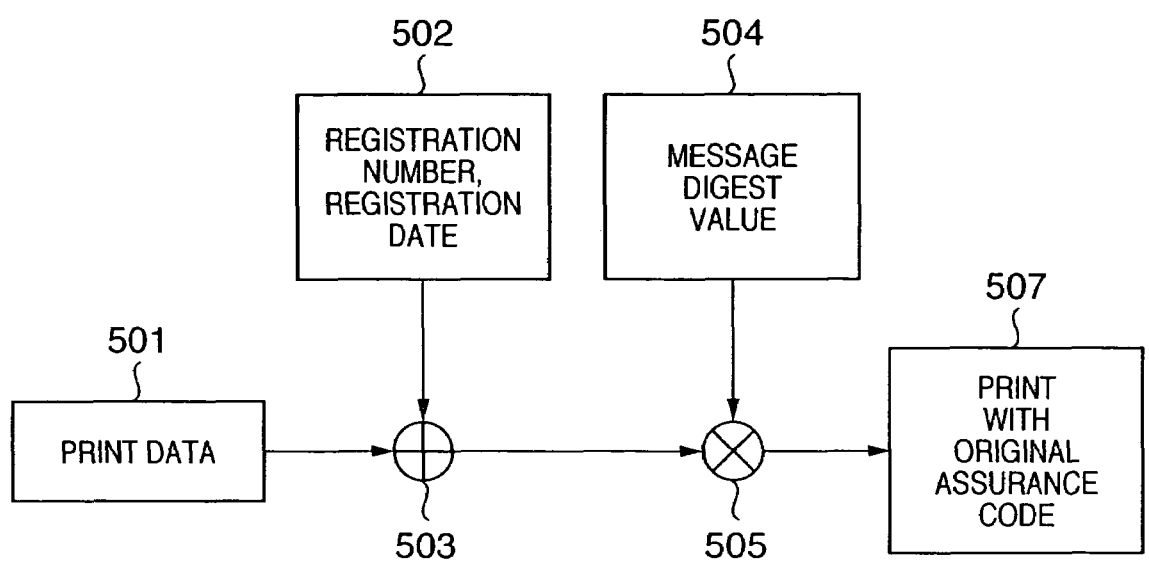
FIG. 5 is a view for explaining details of a print data generation process (step S407)

FIG. 5 is a view for explaining details of the print data generation process (step S407) in FIG. 4. Reference numeral 503 means that the registration number and registration date 301 in FIG. 3 (502 in FIG. 5) are appended onto print data. Reference numeral 505 means that a message digest value (504 in FIG. 5) is superimposed on the print data as a digital watermark by a method shown in FIG. 7. In this way, print data 507 with an original assurance code is generated based on print data 501.

Figure 6:
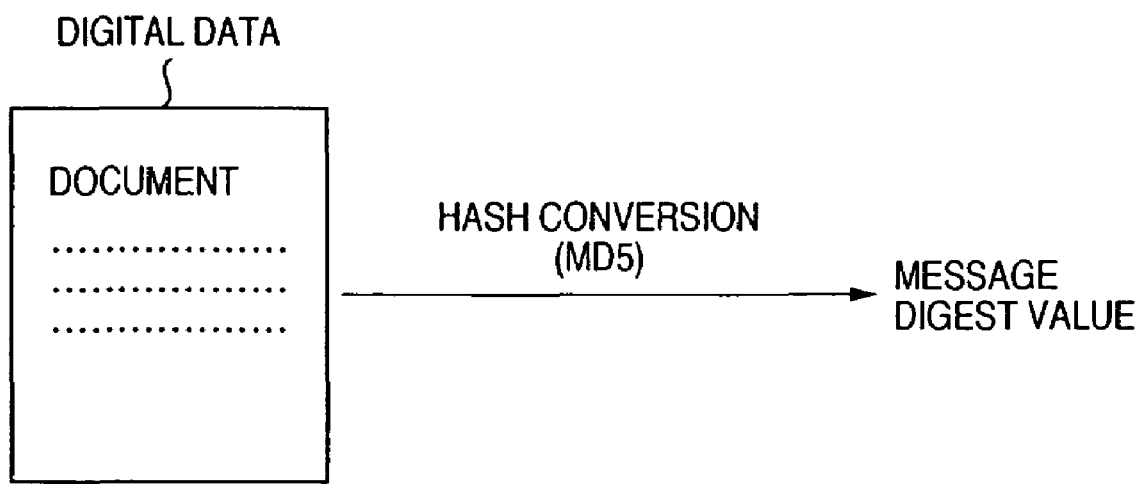
FIG. 6 is a view for explaining details of a feature amount extraction process (step S403)

FIG. 6 is a view for explaining details of the feature amount extraction process (step S403) in FIG. 4. In this embodiment, a message digest value is calculated using a hash function called MD5. MD5 is used as a message digest function in PGP (Pretty Good Privacy) as one of encryption programs which are currently used in practical use.

Figure 7:
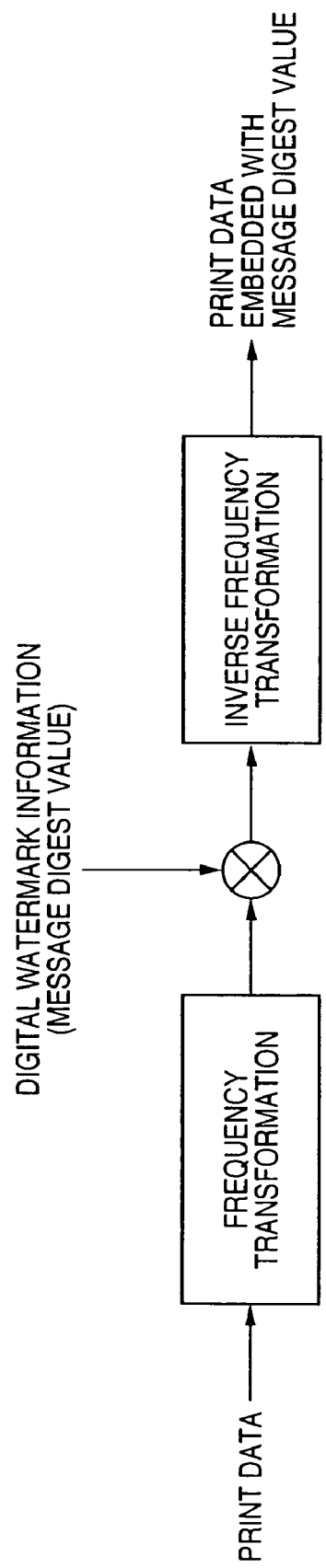
FIG. 7 is a view for explaining a process for appending a message digest value as a digital watermark information to the print data.

FIG. 7 is a view for explaining the process for appending the message digest value (feature amount) as digital watermark information to print data. Since the digital watermarking technique is a known technique, and is disclosed in, e.g., Japanese Patent Laid-Open No. 9-191394, a description thereof will be omitted.

[Authentication Process of Originality]

Figure 8:
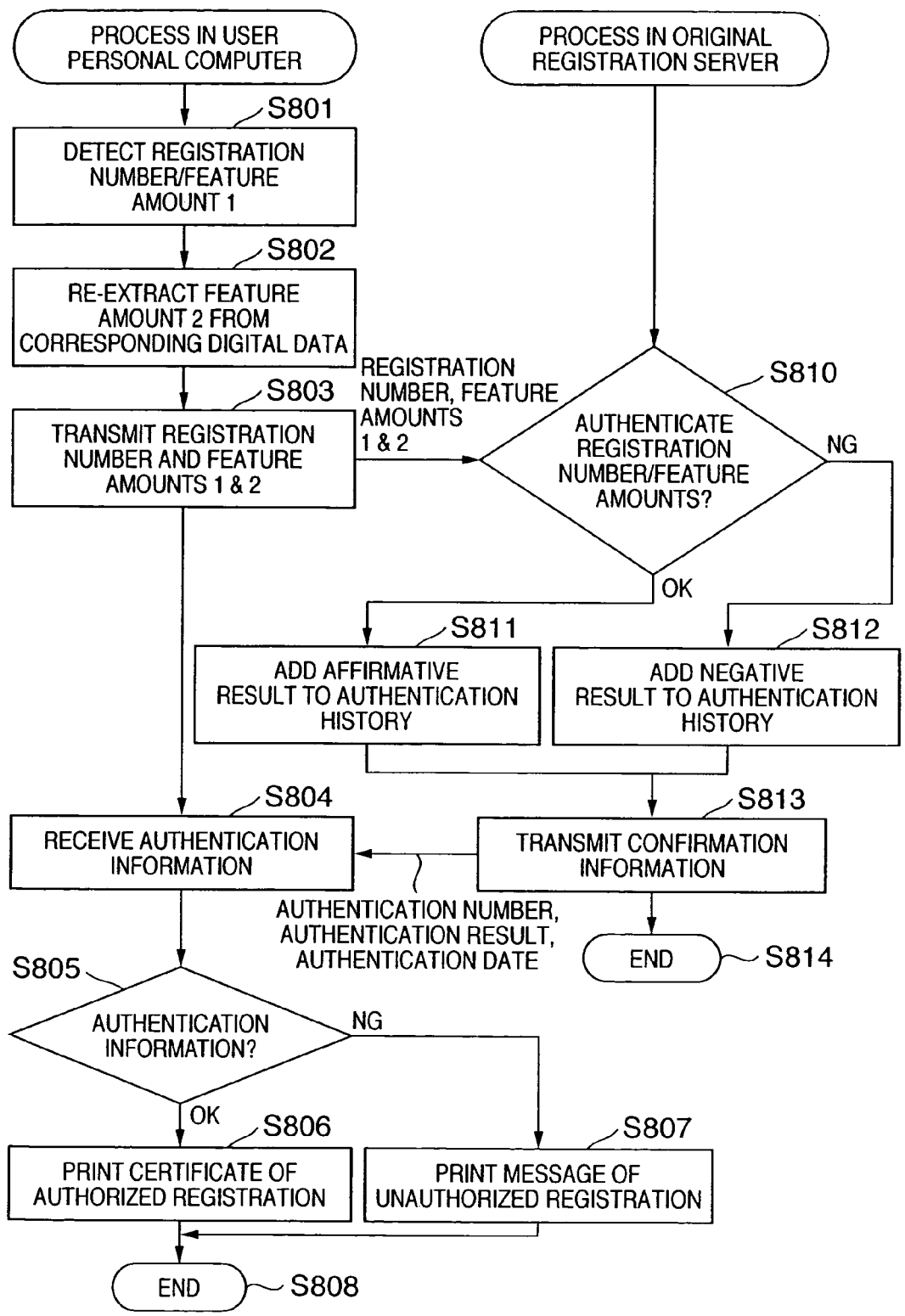
FIG. 8 is a flowchart for explaining the flow of processes required to authenticate the originality of digital data printed on a recording medium in the image processing system.

The flow of processes upon authenticating the originality of digital data printed on a recording medium will be explained below. FIG. 8 is a flowchart showing the flow of processes executed upon authenticating the originality of digital data printed on a recording medium.

Steps S801 to S808 indicate processes in the user personal computer 200, and steps S810 to S814 indicate those in the original registration server 220. The processes in the user personal computer 200 will be explained first. In step S801, the print (recording medium) 211 with an original assurance code is read by the reader 201 to extract the registration number and registration date 502 and message digest value 504 (feature amount 1).

In step S802, corresponding digital data is read out from the second storage medium on the basis of the registration number extracted in step S801, and a message digest value (feature amount 2) is re-extracted from the readout digital data. In step S803, feature amount 1 and registration number read from the print 211 with an original assurance code, and feature amount 2 re-extracted from the digital data are sent to the original registration server 220. In step S804, an authentication result is received from the original registration server 220.

If the authentication result is OK in step S805, the flow advances to step S806 to print a certificate of authorized registration shown in FIG. 9. On the other hand, if the authentication result is NG, the flow advances to step S807 to print a message indicating that registration cannot be authenticated.

The originality authentication process in the original registration server 220 will be explained below. In step S810, feature amount 1 and registration number read from the print 211 with an original assurance code, and feature amount 2 re-extracted from the digital data are received to specify the corresponding digital data. Then, the feature amount stored in the first storage means of the original registration server 220 is compared with feature amount 2. If the comparison result is OK (two amounts match), the flow advances to step S811 to describe an affirmative result in the original registration file 211 as an authentication result; if the comparison result is NG (two amounts do not match), the flow advances to step S812 to describe a negative result in the original registration file 211. In step S813, the authentication number, authentication result (affirmative or negative result), and authentication date are transmitted as authentication information to the user personal computer 200, thus ending the process.

Note that the information of the print 211 with an original assurance code and information registered in the original registration server 220 are associated with each other upon registering digital data. If these two pieces of information do not match, an error is displayed on the display device 107 of the user personal computer 200. When no digital data stored in the second storage means is found, a message "corresponding digital data is not found" is displayed to inform the user.

In the above description, the second storage means as a save destination of digital data is arranged in the user personal computer 200 upon registering digital data. However, the present invention is not limited to this, and the second storage means may be arranged in devices other than the user personal computer 200 (except for the original registration server 220).

That is, a device other than the original registration server 220 and client may store digital data.

In the above description, upon authenticating the originality in the original registration server 220, match/mismatch between the feature amount extracted upon registering digital data, and that re-extracted upon authenticating the originality, i.e., match/mismatch between the already registered digital data and current digital data stored in the second storage means is authenticated. If the two data do not match, a message indicating that originality cannot be authenticated is printed. However, the present invention is not limited to this. For example, when digital data stored in the second storage means has been updated, the two data are different from each other. In such case, a message indicating that the registered document is different from the current document may be printed as shown in FIG. 13 in step S807 in FIG. 8.

In the above description, upon authenticating the originality of digital data printed on the recording medium, the registration authentication result is printed in the form of a normal print (see FIGS. 9 and 10). However, the present invention is not limited to this. For example, the registration authentication result may be appended on the entire print image using characters with a low density. In this manner, the registration authentication result becomes hard to be tempered with.

[Digital Data Update Process and Originality Authentication Process of Updated Digital Data]

In the above description, a case has been explained wherein new digital data is registered. However, the present invention is not limited to such specific cases, and may be applied to a case wherein the already registered digital data is updated. Upon registering updated digital data, an original update mode (not shown) is selected in the registration process in FIG. 4, and digital data to be updated is registered by also appending information used to specify the digital data of the old version. More specifically, the original registration server 220 registers an original registration file of updated digital data in the same manner as in new registration. Furthermore, the original registration server 220 stores the contents (e.g., registration number) of the original registration file of the digital data of old version in association with the original registration file of the updated digital data so as to refer to the registration number. On the other hand, information indicating that the digital data has been updated is appended to the original registration file of the digital data of the old version.

Note that the ability to select the original update mode and update digital data is limited to the same person who registered the old version or a number of users may be registered in advance and permission/inhibition of update registration may be determined based on the user ID.

The flow of the originality authentication process when digital data that has been updated and registered in the original update mode is printed on the recording medium in the image processing system will be explained below. This process is the same as that in the originality authentication process in FIG. 8. However, if the feature amounts of corresponding digital data do not match in feature amount authentication in step S810, feature amounts are compared using the associated old and updated versions as candidates.

The comparison result is classified into one of four classes, i.e., (1) match with the feature amount of digital data of latest version, (2) match with the feature amount of digital data of old version, (3) the corresponding digital data has been updated, and (4) no corresponding digital data is found to inform the user of the classification result.

Furthermore, if the feature amount extracted from the print matches that of the digital data of old version, user authentication (e.g., user ID or the like) is made. If it is determined as a result of user authentication that the user has an authentic access right, i.e., he or she can update digital data, the control permits that user to print digital data of latest version.

[Other Embodiments]

Note that the objects of the present invention are also achieved by supplying a storage medium (or recording medium), which records a program code of a software program that can implement the functions of the above-mentioned embodiments to the system or apparatus, and reading out and executing the program code stored in the storage medium by a computer (or a CPU or MPU) of the system or apparatus.

In this case, the program code itself reads out from the storage medium and implements the functions of the above-mentioned embodiments, and the storage medium which stores the program code constitutes the present invention.

As the storage medium used to supply the program code, for example, a flexible disk, hard disk, optical disk, magneto-optical disk, CD-ROM, CD-R, magnetic tape, nonvolatile memory card, ROM, and the like may be used.

The functions of the above-mentioned embodiments may be implemented not only by executing the readout program code by the computer but also by some or all of actual processing operations executed by an OS (basic system or operating system) running on the computer on the basis of an instruction of the program code.

Furthermore, the functions of the above-mentioned embodiments may be implemented by some or all of actual processing operations executed by a CPU or the like arranged in a function extension board or a function extension unit, which is inserted in or connected to the computer, after the program code read out from the storage medium is written in a memory of the extension board or unit. When the present invention is applied to the storage medium, that storage medium stores the program codes corresponding to the aforementioned flow charts.

The present invention is not limited to the above embodiments and various changes and modifications can be made within the spirit and scope of the present invention. Therefore to apprise the public of the scope of the present invention, the following claims are made.

CLAIM OF PRIORITY

This application claims priority from Japanese Patent Application No. 2003-403553 filed on Dec. 2, 2003, which is hereby incorporated by reference herein.

What is claimed is:

1. An image processing system in which a client and server are connected to communicate with each other, wherein
said client comprises:
an extraction unit configured to extract a feature amount of digital data to be printed; and
a first transmission unit configured to transmit the feature amount extracted by said extraction unit to said server,
said server comprises:
a first storage unit configured to store the feature amount transmitted by said first transmission unit, a registration number required to specify the feature amount and an information indicating whether the digital data corresponding to the feature amount is an old version or an update version; and
a second transmission unit configured to transmit a date of storage in said first storage unit and the registration number stored in said first storage unit to said client,
said client further comprises:
a second storage unit configured to store the date and the registration number transmitted by said second transmission unit in correspondence with the digital data;
an output unit configured to output the date and the registration number transmitted by said second transmission unit and the digital data stored in said second storage unit to print them on a predetermined recording medium;
an acquisition unit configured to acquire the registration number printed on the recording medium which is obtained by reading the printed recording medium;
a re-extraction unit configured to read out the digital data stored in said second storage unit on the basis of the registration number acquired by said acquisition unit and re-extract a feature amount of the digital data stored in said second storage unit; and a third transmission unit configured to transmit the feature amount re-extracted by said re-extraction unit and the registration number acquired by said acquisition unit to said server; and said server further comprises:

a determination unit configured to determine that the digital data read out on the basis of the registration number acquired by said acquisition unit corresponds to either one of i) a case wherein no corresponding digital data is found in said second storage unit, ii) a case wherein the digital data has been updated, iii) a case wherein the digital data is an old version, and iv) a case wherein the digital data is a latest version, on the basis of the feature amount re-extracted by the re-extraction unit and the registration number acquired by said acquisition unit which are transmitted by said third transmission unit, and on the basis of the registration number, the feature amount and the information indicating whether the digital data corresponding to the feature amount is an old version or an updated version which are stored in said first storage unit; and a fourth transmission unit configured to transmit the determination result determined by said determination unit to said client.

2. An information processing method executed by a processor in an image processing system in which a client and server are connected to communicate with each other, wherein the client executes:

an extraction step of extracting a feature amount of digital data to be printed; and a first transmission step of transmitting the feature amount extracted in the extraction step and a user identifier of the client to the server, the server executes:

a first storage step of storing the feature amount transmitted in the first transmission step, a registration number required to specify the feature amount and an information indicating whether the digital data corresponding to the feature amount is an old version or an updated version; and a second transmission step of transmitting a date of storage in the first storage step, and the registration number stored in the first storage step to the client, the client further executes:

a second storage step of storing the date and the registration number transmitted in said second transmission step in correspondence with the digital data;

an output step of outputting the date and the registration number transmitted in said second transmission step and the digital data to print them on a predetermined recording medium;

an acquisition step of acquiring the registration number printed on the recording medium which is obtained by reading the printed recording medium;

a re-extraction step of reading out the digital data stored in the second storage step on the basis of the registration number acquired in said acquisition step and re-extracting a feature amount of the digital data stored in the second storage step; and a third transmission step of transmitting the feature amount re-extracted in said re-extraction step and the registration number acquired in said acquisition step to said server; and said server further executes:

a determination step of determining that the digital data read out on the basis of the registration number acquired in said acquisition step corresponds to either one of:

i) a case wherein no corresponding digital data is found in said acquisition step, ii) a case wherein the digital data has been updated, iii) a case wherein the digital data is an old version, and iv) a case wherein the digital data is a latest version, on the basis of the feature amount re-extracted in said re-extraction step and the registration number acquired in said acquisition step which are transmitted in said third transmission step, and on the basis of the registration number, the feature amount and the information indicating whether the digital data corresponding to the feature amount is an old version or an updated version which are stored in said first storage step; and a fourth transmission step of transmitting the determination result determined in said determination step to said client.

* * * * *